(12) United States Patent
Sherman (10) Patent No.: US 7,773,071 B2
(45) Date of Patent: Aug. 10, 2010

(54) MOVING AN IMAGE WITH AN INPUT DEVICE

(75) Inventor: Nathan C. Sherman, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 855 days.

(21) Appl. No.: 11/158,607

(22) Filed: Jun. 22, 2005

(65) Prior Publication Data

US 2007/0013660 A1 Jan. 18, 2007

(51) Int. Cl.
*G06F 3/033* (2006.01)
(52) U.S. Cl. ...................... 345/163; 345/157
(58) Field of Classification Search .......... 345/157, 345/163, 159, 123, 145, 348, 158, 160; 715/784, 715/856, 857, 858, 859; 340/995; 395/610, 395/145
See application file for complete search history.

(56) References Cited

U.S. PATENT DOCUMENTS

| | | | | |
|---|---|---|---|---|
| 4,698,626 A * | 10/1987 | Sato et al. | ............... | 345/166 |
| 5,245,321 A * | 9/1993 | Franz et al. | ............... | 345/172 |
| 5,287,120 A * | 2/1994 | Okada et al. | ............... | 345/163 |
| 5,298,890 A * | 3/1994 | Kanamaru et al. | ............... | 345/157 |
| 5,313,229 A * | 5/1994 | Gilligan et al. | ............... | 345/157 |
| 5,398,044 A * | 3/1995 | Hill | ............... | 715/857 |
| 5,530,455 A | 6/1996 | Gillick et al. | | |
| 5,912,661 A | 6/1999 | Siddiqui | | |
| 6,075,518 A | 6/2000 | Pruchniak | | |
| 6,097,371 A | 8/2000 | Siddiqui et al. | | |
| 6,128,006 A | 10/2000 | Rosenberg et al. | | |
| 6,219,027 B1 * | 4/2001 | Shimizu et al. | ............... | 715/733 |
| 6,259,432 B1 * | 7/2001 | Yamada et al. | ............... | 345/159 |
| 6,281,881 B1 | 8/2001 | Siddiqui et al. | | |
| 6,353,429 B1 | 3/2002 | Long | | |
| 6,380,927 B1 | 4/2002 | Ostrum et al. | | |
| 6,509,889 B2 * | 1/2003 | Kamper et al. | ............... | 345/157 |
| 7,071,919 B2 * | 7/2006 | Hinckley et al. | ............... | 345/163 |
| 7,324,087 B2 * | 1/2008 | Iijima | ............... | 345/157 |

\* cited by examiner

*Primary Examiner*—Chanh Nguyen
*Assistant Examiner*—Pegeman Karimi
(74) *Attorney, Agent, or Firm*—Merchant & Gould P.C.

(57) ABSTRACT

A system and method for providing a continuous input mode is disclosed. In the continuous input mode, a combination of a vector signal and a command signal is received from an input device. Upon receipt of a vector signal and a command signal, an image is moved on a display screen, for example. The image continues to move until the command signal is terminated. If a new vector signal is received prior to termination of the command signal, then the direction of image movement may be changed and will occur until termination of the command signal. Additional aspects of the present invention relate to input devices and computer-readable media with computer executable instructions utilized in switching between the input modes.

10 Claims, 5 Drawing Sheets

MOVING AN IMAGE WITH AN INPUT DEVICE

BACKGROUND

Throughout the evolution of the field of computer science, a variety of data entry techniques have been developed to enhance usability and make computers more versatile. A typical computing environment, especially a computing environment incorporating graphical user interfaces for user interaction, may be optimized for accepting input from one or more discrete input devices. As an example, an individual may enter characters (i.e., text, numerals, and symbols) with a keyboard and control the position of a pointer image on a display screen with a pointing device. Some computing environments even incorporate a pen-like stylus that may be utilized to enter characters and serve the general purpose of the pointing device.

Examples of conventional pointing devices include a mouse, trackball, and touchpad, for example. Among other functions, a pointing device is utilized to move a pointer image, such as a cursor, relative to a display screen. More particularly, movement of the pointing device or a component associated with the pointing device generates position data corresponding with the movement of the pointing device. The position data is then transmitted to the computer system and processed by the computer system so as to be rendered on the display screen as movement of the pointer image. By utilizing the pointing device, therefore, the user can move the pointer image to a desired location on the display screen. A command key on the pointing device can then be activated to manipulate data or navigate through various menus, buttons, and links.

In addition to moving a pointer image, manipulating data, or navigate, pointing devices may be utilized to control movements in gaming applications. More particularly, a pointing device may be utilized to control a character or the portion of a virtual environment is rendered on a display screen. As an example, by moving the mouse relative a support surface, the virtual environment will pan in the direction of the mouse movement. More particularly, moving the mouse in a leftward direction will cause the virtual environment to pan to in the leftward direction. Similarly, moving the mouse in an upward direction will cause the virtual environment to pan to in the upward direction. Other actions may be performed by activating buttons associated with the mouse. Although each of these actions may be performed with a mouse, similar actions may be performed with a trackball and touchpad. Additionally, each of these actions may be performed with multiple pointing devices or a combination of a pointing device and another input device, for example.

SUMMARY

One aspect of the invention is a method of moving an image with an input device. The method includes a step of producing a first vector signal with the input device. If a command signal is not produced with the first vector signal, the first vector signal is once transmitted. If the command signal is produced with the first vector signal, the first vector signal is repetitively transmitted. The repetitive transmission of the first vector signal continues until one of (a) a second vector signal is produced and (b) the command signal is terminated.

Another aspect of the invention is a method of moving an image. The method includes receiving a first vector signal from an input device. If a command signal is not received with the first vector signal, the first vector signal is used once to move the image. If the command signal is received with the first vector signal (a) the first vector signal is multiplied by a scalar to form a first augmented vector signal, and the first augmented vector signal is repetitively-used to move the image, use of the first augmented vector signal continuing until one of (a) a second vector signal is received and (b) the command signal is terminated.

Yet another aspect of the invention is an input device having a housing, a tracking assembly and an actuator. The housing forms at least a portion of an exterior of the input device. The tracking assembly is at least partially located within the housing for detecting movement of at least one of (a) the input device relative a support surface and (b) a rotatable ball. The tracking assembly also produces a vector signal with direction data and magnitude data corresponding to the movement. The actuator is accessible from the exterior of the input device and produces a command signal, The input device: (a) once transmits the vector signal if no command signal is produced with the vector signal and (b) repetitively transmits the vector signal when the command signal is produced with the vector signal and until the command signal is terminated.

The advantages and features of novelty characterizing the invention are pointed out with particularity in the appended claims. To gain an improved understanding of the advantages and features of novelty, however, reference may be made to the following descriptive matter and accompanying drawings that describe and illustrate various embodiments and concepts related to the invention.

DESCRIPTION OF THE DRAWINGS

The foregoing Summary, as well as the following Detailed Description, will be better understood when read in conjunction with the accompanying drawings.

DETAILED DESCRIPTION

Introduction

Pointing devices, such as a mouse, trackball, or touchpad, are often utilized to move pointer images on a display screen, manipulate data, or navigate through various menus, buttons, or links. Pointing devices may also be utilized to control movements in gaming applications, such as the actions of a character or panning of a virtual environment. When utilizing a mouse, for example, the mouse is moved relative to a support surface. In general, the support surface has a limited area in which the mouse may move. When a mouse pad, for example, is utilized as the support surface, movement of the mouse is limited to the area of the mouse pad. The limited area generally provides sufficient space to permit a full movement of the mouse. In some circumstances, however, the limited area is insufficient to permit a full movement of the mouse. The operator will then lift the mouse from the support surface and reposition the mouse in order to continue with the movement of the mouse. Accordingly, the use of a mouse or other pointing device may result in a syncopated or otherwise non-continuous movement of a pointer image, character, or virtual environment on a display screen.

Aspects of the present invention provide pointing devices, systems, methods, and computer-readable media with computer-executable instructions stored thereon for providing a continuous input mode in a computing environment. For example, the operator may move a mouse in a particular direction to produce a signal indicating that the pointer image, character, or virtual environment should move in a corresponding direction. By depressing a button or other actuator during the movement of the mouse, the signal will repeat until the button or other actuator is released. That is, the operator may selectively place the mouse in a continuous input mode, in which a signal associated with mouse movement repeats until terminated by the operator. Accordingly, relatively small movements of the mouse (i.e., movements within the limited area of a mouse pad) may translate into relatively large movements of the pointer image, character, or virtual environment.

Illustrative Computing Environment

Figure 1:
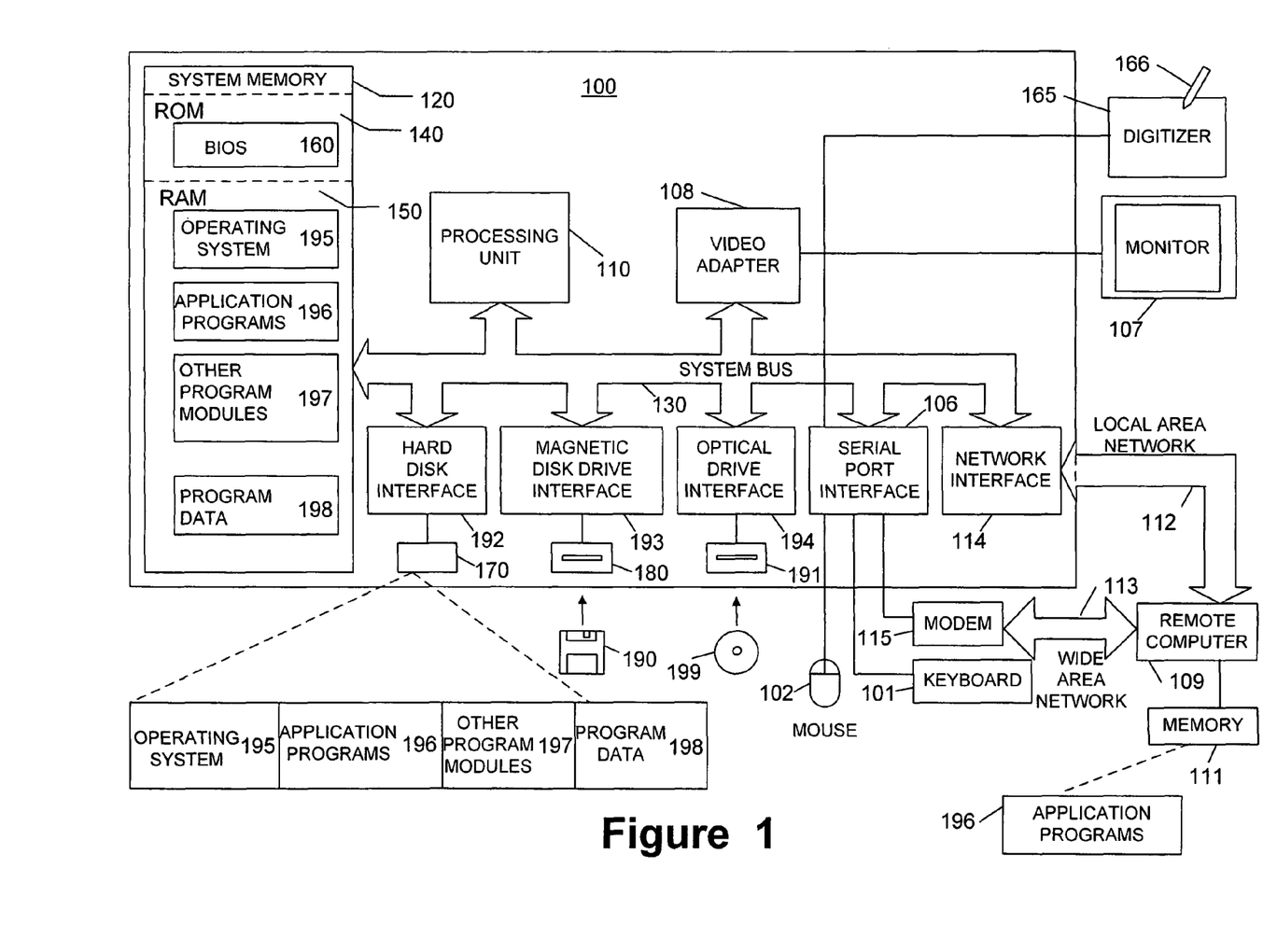
FIG. 1 is a schematic diagram of a general-purpose digital computer operating environment in which various aspects of the invention may be implemented.

FIG. 1 illustrates a schematic diagram of a general-purpose digital computing environment that can be used to implement various aspects of the invention. In FIG. 1, a computer 100 includes a processing unit 110, a system memory 120, and a system bus 130 that couples various system components including the system memory 120 to the processing unit 110. The system bus 130 may be any of several types of bus structures including a memory bus or memory controller, a peripheral bus, and a local bus using any of a variety of bus architectures. The system memory 120 may include read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also may include a hard disk drive 170 for reading from and writing to a hard disk (not shown), a magnetic disk drive 180 for reading from or writing to a removable magnetic disk 190, and an optical disk drive 191 for reading from or writing to a removable optical disk 199, such as a CD ROM or other optical media. The hard disk drive 170, the magnetic disk drive 180, and the optical disk drive 191 are connected to the system bus 130 by a hard disk drive interface 192, a magnetic disk drive interface 193, and an optical disk drive interface 194, respectively. These drives and their associated computer-readable media provide nonvolatile storage of computer-readable instructions, data structures, program modules, and other data for the personal computer 100. It will be appreciated by those skilled in the art that other types of computer-readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, the magnetic disk 190, the optical disk 199, the ROM 140, or the RAM 150, including an operating system 195, one or more application programs 196, other program modules 197, and program data 198. A user can enter commands and information into the computer 100 through input devices, such as a keyboard 101 and pointing device 102 (such as a mouse). Other input devices (not shown) may include a microphone, joystick, game pad, satellite dish, scanner, or the like. These and other input devices are often connected to the processing unit 110 through a serial port interface 106 that is coupled to the system bus 130, but they also may be connected by other interfaces, such as a parallel port, game port, or a universal serial bus (USB), and the like. Further still, these devices may be coupled directly to the system bus 130 via an appropriate interface (not shown).

A monitor 107 or other type of display device also may be connected to the system bus 130 via an interface, such as a video adapter 108. In addition to the monitor 107, personal computers typically include other peripheral output devices (not shown), such as speakers and printers. In one example, a pen digitizer 165 and accompanying pen or stylus 166 are provided in order to digitally capture freehand input. Although a connection between the pen digitizer 165 and the serial port interface 106 is shown in FIG. 1, in practice, the pen digitizer 165 may be directly coupled to the processing unit 110, or it may be coupled to the processing unit 110 in any suitable manner, such as via a parallel port or another interface and the system bus 130 as is known in the art. Furthermore, although the digitizer 165 is shown apart from the monitor 107 in FIG. 1, the usable input area of the digitizer 165 may be co-extensive with the display area of the monitor 107. Further still, the digitizer 165 may be integrated in the monitor 107, or it may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and it typically includes many or all of the elements described above relative to the computer 100, although for simplicity, only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet, using both wired and wireless connections.

When used in a LAN networking environment, the computer 100 is connected to the local area network 112 through a network interface or adapter 114. When used in a WAN networking environment, the personal computer 100 typically includes a modem 115 or other means for establishing a communications link over the wide area network 113, such as the Internet. The modem 115, which may be internal or external to the computer 100, may be connected to the system bus 130 via the serial port interface 106. In a networked environment, program modules depicted relative to the personal computer 100, or portions thereof, may be stored in the remote memory storage device.

It will be appreciated that the network connections shown are examples and other techniques for establishing a communications link between the computers can be used. The existence of any of various well-known protocols such as TCP/IP, Ethernet, FTP, HTTP, UDP, and the like is presumed, and the system can be operated in a user-server configuration to permit a user to retrieve web pages from a web-based server. Any of various conventional web browsers can be used to display and manipulate data on web pages.

Although the FIG. 1 environment shows an illustrative environment, it will be understood that other computing environments also may be used. For example, one or more examples of the invention may use an environment having fewer than all of the various aspects shown in FIG. 1 and described above, and these aspects may appear in various combinations and subcombinations that will be apparent to one of ordinary skill.

Pointing Device Discussion

Figure 2A:
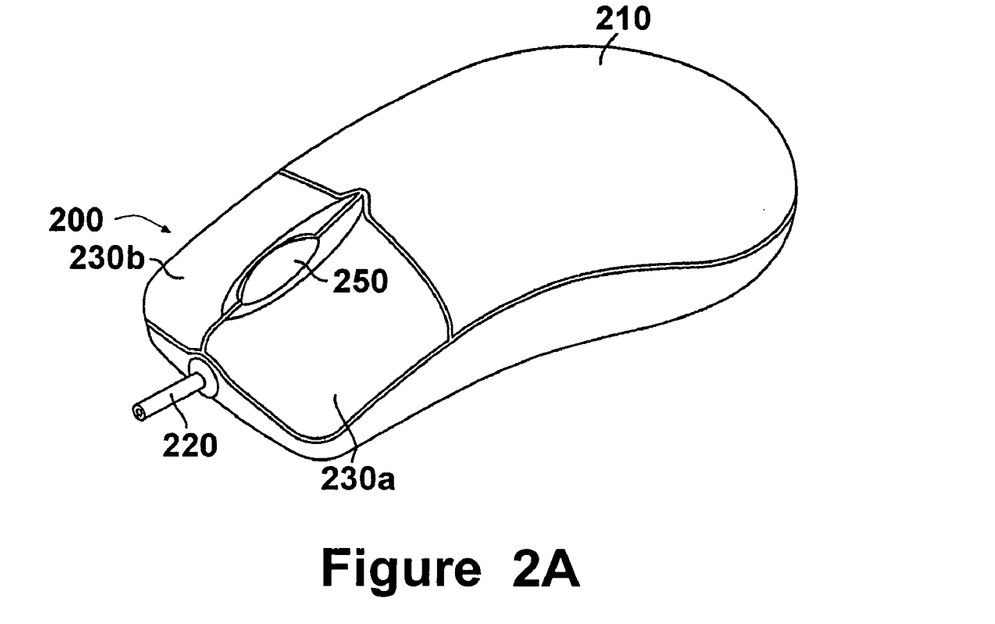
FIG. 2A is a perspective view of a first input device incorporating various aspects of the invention.
Figure 2B:
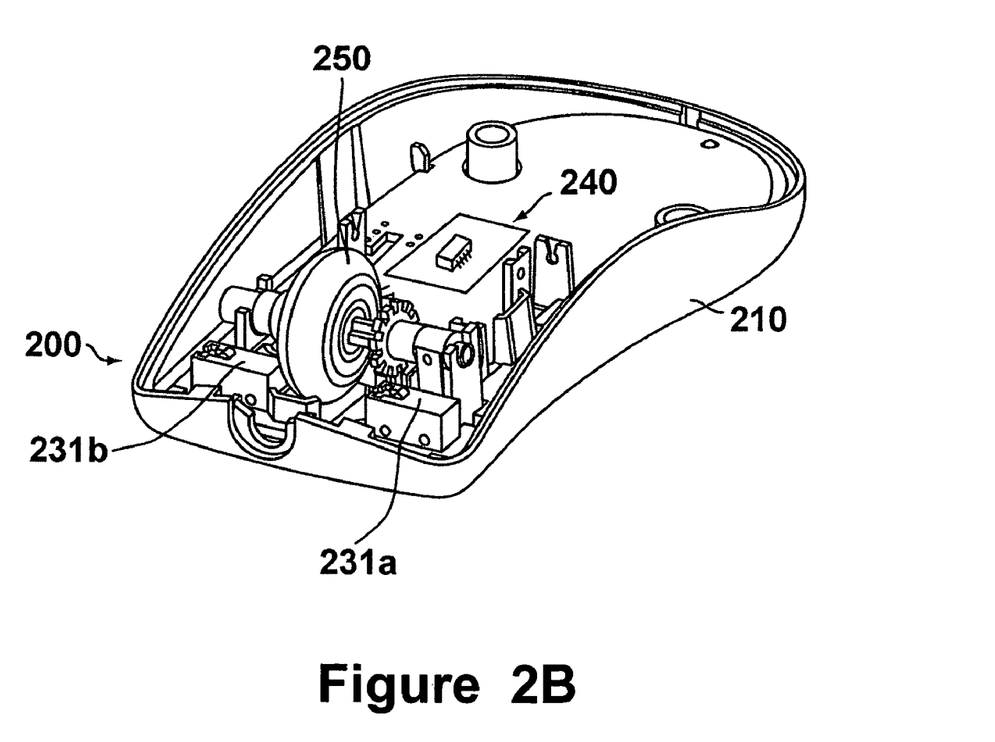
FIG. 2B is a cut away perspective view of the first input device.

The pointing device 102 associated with computer 100 may have the configuration of any conventional pointing device, including a mouse, trackball, or touchpad, for example. A pointing device 200 is depicted in FIGS. 2A and 2B as a mouse-style pointing device. As is well-known in the art, a purpose of the pointing device 200 includes moving a pointer image to manipulate virtual objects, such as buttons, icons, hypertext links, or data associated with an image rendered on a display screen. When utilized in the context of a gaming application, for example, pointing device 200 may also be utilized to control various movements, such as the actions of a character or panning of a virtual environment.

A housing 210 forms a portion of an exterior of the pointing device 200 and has a configuration that interfaces with a hand of the user. A cord 220 extends from a front portion of the housing 210 and is utilized to transmit signals from the pointing device 200 to the computer 100. The signals that are transmitted through the cord 220 are typically generated in response to operator manipulation of a primary key 230a, a secondary key 230b, or a rotatable wheel 250. The signals may also be generated in response to movement of the pointing device 200 relative to a support surface, as detected by a tracking assembly 240.

The primary key 230a and the secondary key 230b each have a depressible structure and are associated with a pair of switches 231a and 231b that are positioned within the housing 210. Accordingly, the primary key 230a may be depressed by the user to activate the switch 231a, thereby generating a signal that is transmitted to the computer 100. Similarly, the secondary key 230b may be depressed by the user to activate the switch 231b. The rotatable wheel 250 may be both depressible and rotatable to generate signals that are transmitted to the computer 100.

The tracking assembly 240 detects translational displacement of the pointing device 200 relative to a support surface upon which the pointing device 200 rests. The tracking assembly 240 is depicted as an optical-based arrangement that detects displacement of the pointing device 200 and transmits a corresponding signal to the computer 100. In general, the tracking assembly 240 has the configuration of an optical sensor system that is disclosed in U.S. Pat. No. 6,172,354 to Adan et al. One skilled in the relevant art will recognize, however, that other suitable optical sensing systems may be utilized within the scope of the invention. As an alternative, the tracking assembly 240 may incorporate a rotatable ball, as is known in the art, that rotates in response to movement of the pointing device 200, thereby generating a signal that is transmitted to the computer 100. In further aspects of the invention, a similar tracking assembly may be utilized to detect rotation of a ball in a trackball pointing device, or a touch-sensitive pad may be utilized as the tracking assembly in a touchpad pointing device.

Figure 2C:
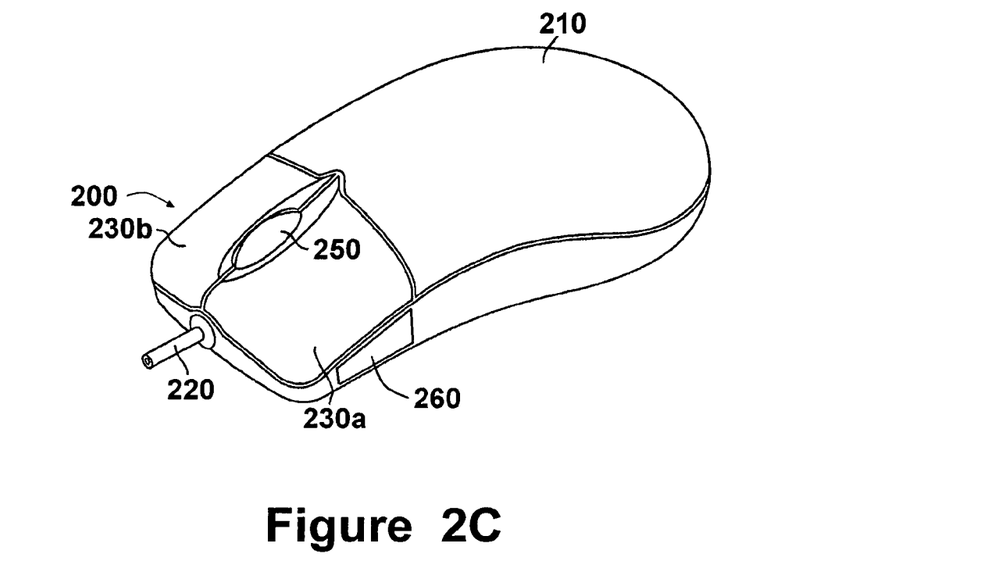
FIG. 2C is a perspective view of a second input device incorporating various aspects of the invention.
Figure 2D:
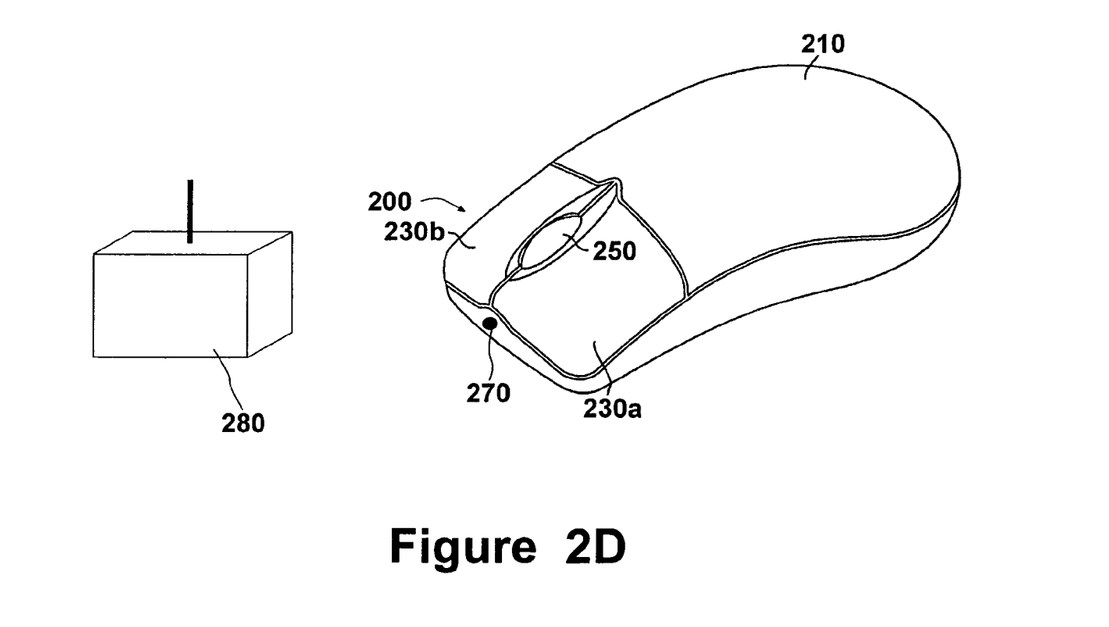
FIG. 2D is a perspective view of a third input device incorporating various aspects of the invention.

The specific configuration of the pointing device 200 may vary significantly. In addition to the keys 230a and 230b, the pointing device 200 may also include other keys that are depressible or touch-sensitive, for example. With reference to FIG. 2C, the pointing device 200 is depicted as including a key 260 located in a side area of the housing 210 and depressible by a thumb of the operator. As an alternative, the key 260 may be located in any other portion of the pointing device 200. As with the keys 230a and 230b, a switch (not depicted) may be located within the housing 210 in order to detect movement or contact with the key 260. As an alternative to the cord 220, a conventional wireless connection between the pointing device 200 and the computer 100 may also be utilized, as depicted in FIG. 2D. When a conventional wireless connection is utilized, the pointing device 200 incorporates a transmitter 270 that transmits signals to a receiver 280 associated with the computer 100. That is, signals generated by the keys 230a and 230b, the tracking assembly 240, and the rotatable wheel 250 are transmitted by transmitter 270 to receiver 280 and subsequently sent to the computer 100.

Use of the Pointing Device

Pointing device 200 may be utilized to move a pointer image to manipulate virtual objects, such as buttons, icons, hypertext links, or data associated with an image rendered on a display screen. When utilized in the context of a gaming application, for example, pointing device 200 may also be utilized to control various movements, such as the actions of a character or panning of a virtual environment. For purposes of the following discussion, pointing device 200 will be discussed as controlling the panning of a virtual environment.

Pointing device 200 may be utilized in a conventional input mode to pan the virtual environment in a desired direction. In the conventional input mode, panning occurs during movement of the pointing device 200, and panning terminates upon a cessation of movement of the pointing device 200. By moving the pointing device 200 relative to a support surface, the virtual environment will pan a discrete degree in the direction of movement. More particularly, moving the pointing device 200 in a leftward direction will cause the virtual environment to pan a corresponding degree in the leftward direction. Similarly, moving the pointing device 200 in an upward direction will cause the virtual environment to pan a corresponding degree in the upward direction. The degree to which panning occurs depends primarily upon the distance that the pointing device 200 is moved relative to the support surface. Moving the pointing device 200 a relatively short distance will induce a relatively small degree of panning, and moving the pointing device 200 a greater distance will induce a greater degree of panning.

Pointing device 200 may also be utilized in a continuous input mode to continuously pan the virtual environment. In the continuous input mode, panning continues to occur even when movement of the pointing device 200 terminates. In order to enter the continuous input mode, the operator activates a predetermined command key, which may be any one of keys 230a, 230b, or 260, for example. While continuing to hold the command key, the operator moves the pointing device 200 relative to a support surface. Once movement of the pointing device 200 ceases, the operator continues to hold the command key and panning continues in the direction of movement of the pointing device 200 until the command key is released. That is, holding the command key induces the virtual environment to continuously pan until the command key is released. From the perspective of the operator, therefore, panning will continue despite a cessation of movement of the pointing device 200.

In order to provide the ability to operate in a conventional input mode and a continuous input mode, the pointing device 200 transmits at least one of a vector signal and a command signal to the computer 100. The vector signal carries data relating to the movement of the pointing device 200 relative to the support surface. More particularly, the vector signal includes both direction data and magnitude data. The direction data is utilized by the computer 100 to determine the direction in which the pointing device 200 is moved relative to the support surface. Similarly, the magnitude data is utilized by the computer 100 to determine the distance or velocity that the pointing device 200 is moved relative to the support surface. The command signal carries data relating to activation of the command key (e.g., any one of keys 230a, 230b, or 260).

When utilized in the conventional input mode, only a vector signal is transmitted to the computer 100. Upon receipt of only a vector signal, therefore, the computer 100 pans the virtual environment in a direction of the direction data and to a degree corresponding with the magnitude data. If a new vector signal is received, the computer 100 the virtual environment in a direction of the new direction data and to a degree corresponding with the new magnitude data.

When utilized in the continuous input mode, however, a combination of a vector signal and a command signal is received by the computer 100. Upon receipt of a vector signal and a command signal, therefore, the computer 100 pans the virtual environment in a direction of the direction data and to a degree corresponding with the magnitude data, and the computer 100 continues to pan the virtual environment until the command signal is terminated. If a new vector signal is received prior to termination of the command signal, then the direction of panning may be changed and panning will occur until termination of the command signal.

In the discussion above, vector signals and command signals are transmitted to the computer 100 in order to enter the continuous input mode. That is, software may be utilized to implement aspects of the invention. As an alternative, the input device 200 may incorporate elements that repetitively-transmits a vector signal when a command key (e.g., any one of keys 230a, 230b, or 260) is activated. Hardware within the pointing device 200, for example, may determine whether the system is in the conventional input mode or the continuous input mode. Accordingly, the manner in which aspects of the invention are implemented may vary significantly.

Based upon the above discussion, the pointing device 200 may be utilized in either the conventional input mode or the continuous input mode as the discretion of the operator. In the conventional input mode, movement of a pointer image, movement of a character in a gaming application, or panning of a virtual environment in the gaming application, for example, occur only when the pointing device 200 is moved relative to a support surface. In the continuous input mode, however, movement of a pointer image, movement of a character in a gaming application, or panning of a virtual environment in the gaming application, for example, occurs until the operator releases a command key. Accordingly, movement or panning may occur even after movement of the pointing device 200 has ceased.

System Discussion

Figure 3:
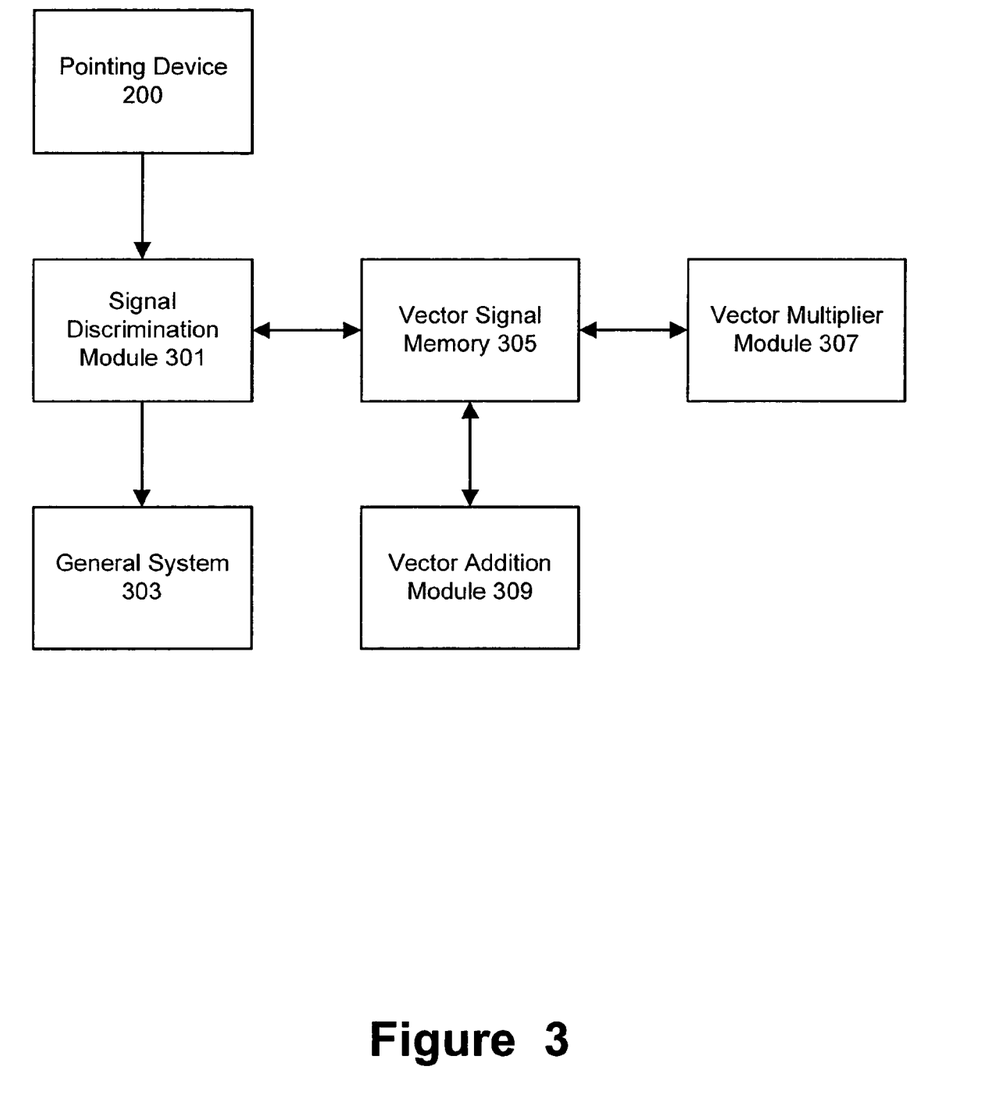
FIG. 3 is a schematic diagram of a system in which various aspects of the invention may be implemented.

With reference to FIG. 3, an illustrative system incorporating aspects of the invention is disclosed. The system includes the pointing device 200, which is operatively connected to a signal discrimination module 301 and transmits one or both of a vector signal and a command signal to the signal discrimination module 301, which receives and processes the vector signal and the command signal. The signal discrimination module 301 is operatively connected to each of a general system 303 and a vector signal memory 305. In circumstances where the signal discrimination module 301 receives only a vector signal from the pointing device 200 (i.e., when in the conventional input mode), the signal discrimination module transmits direction data and magnitude data to the general system 303, which represents other portions of the computer 100. In circumstances where the signal discrimination module 301 receives both a vector signal and a command signal from the pointing device 200 (i.e., when in the continuous input mode), the signal discrimination module transmits direction data and magnitude data to the vector signal memory 305, which may be any type of memory, including the read only memory 140 or the random access memory 150, that is suitable for storing direction data and magnitude data associated with the vector signal.

The vector signal memory 305 is operatively connected to each of a vector multiplier module 307 and a vector addition module 309. As will be described in greater detail below, the vector multiplier module 307 is utilized to multiply the vector signal by a predetermined scalar. More particularly, the vector multiplier module 307 is utilized to multiply vector signal data by the scalar. As will also be described in greater detail below, the vector addition module 309 is utilized to add the vector signal data associated with the vector signal to vector signal data associated with another vector signal to produce a vector sum. Whether the vector signal data is multiplied by the scalar or added to vector signal data from another vector signal, the resulting vector signal data may be stored in the vector signal memory 305 and retrieved by the signal discrimination module 301.

When the signal discrimination module 301 receives only a vector signal from the pointing device 200 (i.e., when in the conventional input mode), the signal discrimination module transmits the vector signal or data from the vector signal to the general system 303. For example, if the operator merely moves the input device 200 relative a support surface, the input device 200 will transmit a vector signal to the signal discrimination module 301. The signal discrimination module 301 will, in turn, transmit the vector signal or data from the vector signal to the general system 303. When received by the general system 303, the vector signal or data from the vector signal will be used to move a pointer image on a display screen or control movements in a gaming application, for example. More particularly, one discrete movement of the pointer image, movement of the character in the gaming application, or panning of the virtual environment in the gaming application will occur based upon the direction data and magnitude data of the vector signal. Once the movement is complete, no further movement will occur until a subsequent vector signal is received from the pointing device 200.

In circumstances where a command signal is received with a vector signal (i.e., when in the continuous input mode), the signal discrimination module 301 stores data from the vector signal in the vector signal memory 305. The vector signal data of the vector signal may be multiplied by the scalar, or the vector signal data may be added to vector signal data from a subsequently-received vector signal. In either scenario, however, the vector signal data stored in the vector signal memory 305 is repetitively-transmitted to the general system 303 as long as the command signal continues to be received. When the command signal is terminated, the signal discrimination module 301 terminates the repetitive transmission of the vector signal data stored in the vector signal memory 305. Accordingly, receipt of a vector signal and a command signal places the system in a continuous input mode, wherein vector signal data is repetitively-transmitted to the general system 303.

When in the continuous input mode, vector signal data from the vector signal is repetitively transmitted to the general system 303 until the command signal is terminated. Accordingly, movement of the pointer image, movement of the character in the gaming application, or panning of the virtual environment in the gaming application will occur until the command signal is terminated by the operator.

Method Discussion

An enhanced understanding of the system discussed above may be gained through reference to FIG. 4, which discloses a flow diagram illustrating steps performed in each of the conventional input mode and the continuous input mode. Initially, steps performed in the conventional input mode (i.e., Steps 401-407) will be discussed. Subsequently, steps performed in the continuous input mode (i.e., Steps 401-405 and 409-421) will be discussed.

A. Conventional Input Mode Method

Figure 4:
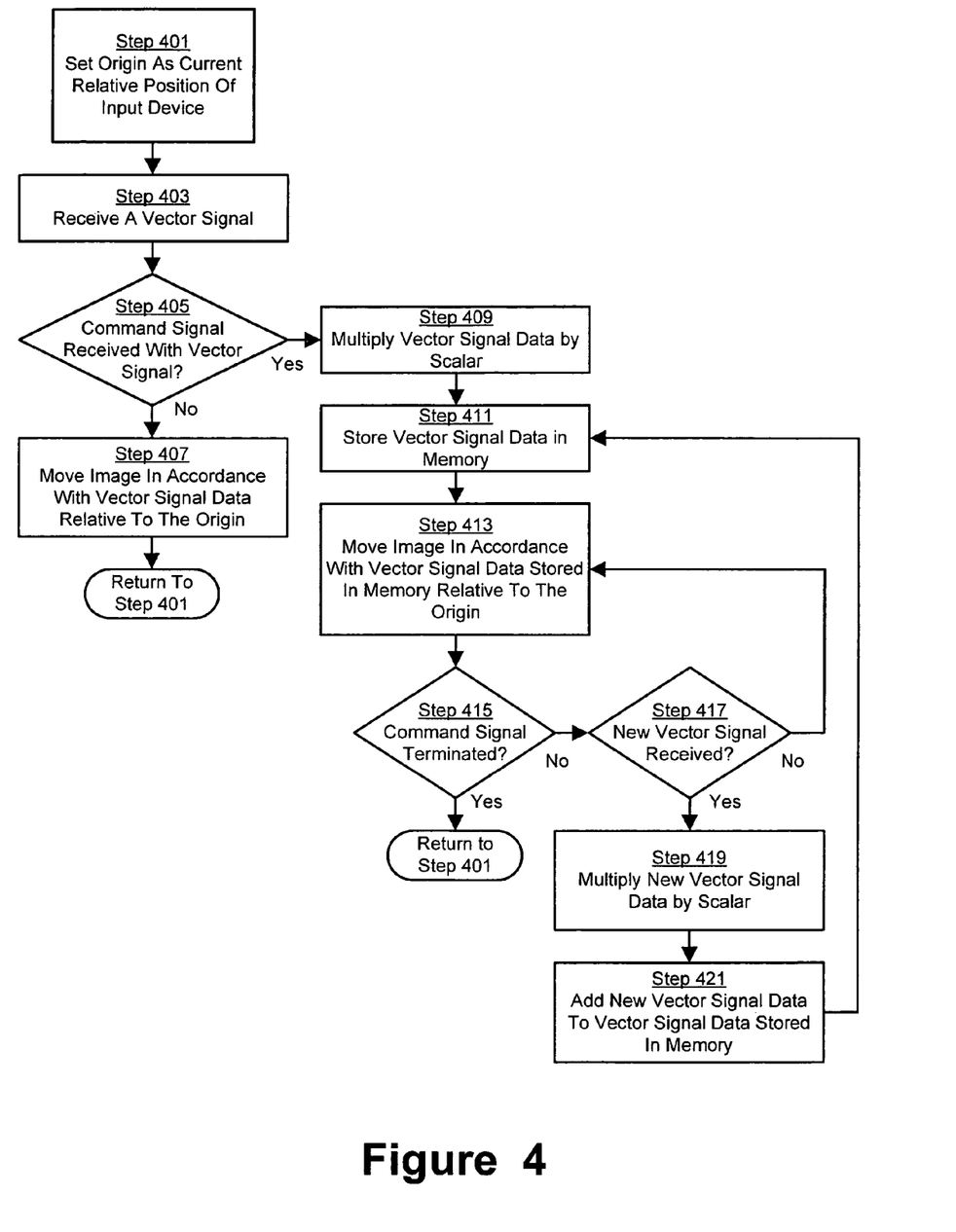
FIG. 4 is a flow diagram illustrating a method of providing a continuous input according to various examples of the invention.

To begin the conventional input mode, an origin is set as the current relative position of an input device (Step 401). The input device may be the pointing device 200 or any other pointing device, including a trackball pointing device and a touchpad pointing device. Unlike a mouse (i.e., pointing device 200), a trackball pointing device and a touchpad pointing device do not change position during use. Accordingly, the origin may be set as the current relative position of a trackball in the trackball pointing device or the initial position where a finger contacts the touchpad.

A vector signal is then received from the input device (Step 403). Upon movement of the pointing device 200, for example, a vector signal is transmitted, and the vector signal includes vector signal data corresponding to the direction of the movement and the magnitude of the movement. In the conventional input mode, no command signal is received with the vector signal (Step 405). Accordingly, an image is moved in accordance with vector signal data relative the origin (Step 407). That is, movement of the pointer image, movement of the character in the gaming application, or panning of the virtual environment in the gaming application will occur based upon direction data and magnitude data of the vector signal. Accordingly, movement of the input device, such as pointing device 200, induces movement on a display screen. The system then returns to Step 401.

This conventional input mode method may be repeated indefinitely through movements of the input device. That is, a first movement of the input device will induce a first discrete movement of the image on the display screen, a second movement of the input device will induce a second discrete movement of the image on the display screen, and a third movement of the input device will induce a third discrete movement of the image on the display screen. Accordingly, the operator may move the input device in a left direction, then in an upward direction, and subsequently in a right direction to cause the image to move left, upward, and right in succession. Although each of these discrete movements are independent of each other, the movements may appear to be an uninterrupted movement of the image from the perspective of the operator.

B. Continuous Input Mode Method

To begin the continuous input mode, an origin is set as the current relative position of an input device (Step 401). A vector signal is then received from the input device (Step 403). Upon movement of the pointing device 200, for example, a vector signal is transmitted, and the vector signal includes vector signal data corresponding to the direction of the movement and the magnitude of the movement. In the continuous input mode, a command signal is received with the vector signal (Step 405).

If a command signal is received with the vector signal, vector signal data of the vector signal is multiplied by a scalar (Step 409). In general, pointing devices transmit multiple vector signals for each movement of the pointing device. Accordingly, the magnitude data of the vector signals is relatively small. Multiplying the vector signal data by a scalar has an effect of increasing the magnitude data associated with the vector signal. Once the vector signal data is multiplied by the scalar, the resulting vector signal data is stored in memory (Step 411). The image is then moved in accordance with the vector signal data relative the origin (Step 413). That is, movement of the pointer image, movement of the character in the gaming application, or panning of the virtual environment in the gaming application will occur based upon direction data and magnitude data that are stored in memory. Whereas the conventional input method utilized vector signal data from the vector signal, the continuous input method described herein utilizes vector signal data that is multiplied by a scalar to move the image. Accordingly, movement of the input device, such as pointing device 200, induces movement on a display screen.

Following movement of the image, the system determines whether the command signal is terminated (Step 415). If the command signal has been terminated, the system returns to step 401. If the command signal has not been terminated, however, the system determines whether a new vector signal has been received (Step 417). In circumstances where a new vector signal has not been received, the image is again moved in accordance with the vector signal data relative the origin (Step 413) and the system determines whether the command signal has been terminated (Step 415). Accordingly, the system repetitively-utilizes the vector signal data stored in memory to move the image until the command signal is terminated. That is, movement of the pointer image, movement of the character in the gaming application, or panning of the virtual environment in the gaming application, for example, will continue as long as the command signal continues to be received.

In circumstances where a new vector signal is received, vector signal data associated with the new vector signal is multiplied by the scalar (Step 419) and the added to the vector signal data stored in memory (Step 421). This vector sum, which is a combination of vector signal data, is then stored in memory (Step 411) and utilized to move the image (Step 413). As long as the command signal is not terminated (Step 415) and no new vector signal is received (417), the system repetitively-utilizes the vector signal data stored in memory to move the image until the command signal is terminated.

Further Considerations

In the conventional input mode, the origin is reset to the position of the input device following each discrete movement of the image. Accordingly, the image will move in a direction corresponding to the direction of movement of the input device. In the continuous input mode, however, the origin is set only when the command signal is terminated. During the continuous input mode, multiple vector signals may be received and added together, and movement of the image depends upon the sum of the vector signals. If a first vector signal is in response to a leftward movement of the input device and a second vector signal is in response to an upward movement of the input device, then movement of the image will subsequently be at a 45 degree angle if the magnitude of each vector signal is substantially equal. Accordingly, the direction in which the image moves is related to the sum of the vector signals in the continuous input mode.

As an alternative to the pointing device 200 or in combination with the pointing device 200, the system may include the keyboard 101, the pointing device 102, the stylus 166, a trackball pointing device, a touchpad pointing device, or any other input device, whether of conventional or unconventional design. In some scenarios, a combination of input devices, such as the keyboard 101 and the pointing device 200 may be utilized. When a combination of input devices are present, each of the input devices may transmit one of the vector signal and the command signal to the signal discrimination module 301. As an example, the pointing device 200 may transmit the vector signal and the keyboard 101 may transmit the command signal.

The system and method discussed above may be implemented through hardware or software. That is, the input device 200 may incorporate hardware that repetitively-transmits a vector signal when a command key (e.g., any one of the keys 230*a*, 230*b*, or 260) is activated. Hardware within the pointing device 200, therefore, may determine whether the system is in the conventional input mode or the continuous input mode. As an alternative, software may be utilized for each of the signal discrimination module 301, the vector multiplier module 307, and the vector addition module 309. Accordingly, the manner in which aspects of the invention are implemented may vary significantly.

The invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the invention, as defined by the appended claims.

That which is claimed is:

1. A method of moving an image with an input device, the method comprising:
   producing a first vector signal with the input device, wherein the first vector signal includes a first directional component that corresponds to a first movement of the input device in order to move the image in a first direction;
   storing the first vector signal in the input device;
   multiplying the first vector signal by a scalar to produce a first augmented vector signal; and
   repetitively transmitting the first augmented vector signal from the input device for continuous movement of the image in the first direction upon cessation of movement of the input device and depression of a key on the input device to produce a command signal, wherein the input device is configured to repetitively transmit the first augmented vector signal until a second vector signal is produced, wherein the second vector signal includes a second directional component that corresponds to a second movement of the input device different from the first movement, and wherein the input device is configured to repetitively transmit the first augmented vector signal until the command signal is terminated upon release of the key.

2. The method recited in claim 1, wherein the step of producing the first vector signal includes incorporating direction data and magnitude data into the first vector signal.

3. The method recited in claim 2, wherein the step of producing the first vector signal includes correlating the direction data and the magnitude data to movement of the input device relative a support surface.

4. The method recited in claim 1, further including a step of setting an origin and detecting movement of the input device relative to the origin.

5. The method recited in claim 4, wherein the first augmented vector corresponds to movement of the input device relative to the origin.

6. The method recited in claim 1, further including steps of:
   producing the second vector signal;
   adding the first vector signal to the second vector signal to produce a vector sum signal;
   multiplying the vector sum signal by a scalar to produce a second augmented signal; and
   repetitively transmitting the second augmented signal until one of: a third vector signal is produced and the command signal is terminated.

7. The method recited in claim 1, further including a step of resolving direction data and magnitude data from the first vector signal.

8. The method recited in claim 7, further including a step of moving an image on a display screen in a direction of the direction data and at a distance corresponding to the magnitude data.

9. A method of moving an image, the method comprising:
   producing a first vector signal with an input device, wherein the first vector signal includes a directional component that corresponds to a first movement of the input device in order to move the image in a first direction;
   storing the first vector signal in the input device;
   producing a command signal with the input device;
   multiplying the first vector signal by a scalar to form a first augmented vector signal;
   repetitively transmitting the first augmented vector signal from the input device to continuously move the image in the first direction upon cessation of movement of the input device by resolving direction data and magnitude data from the first augmented vector signal to move the image in a direction of the direction data and at a distance corresponding to the magnitude data;
   producing a second vector signal with the input device, wherein the second vector signal includes a directional component that corresponds to a second movement of the input device different from the first vector signal;
   adding the first vector signal and the second vector signal to produce a vector sum signal;
   multiplying the vector sum signal by a scalar to form a second augmented vector sum signal; and
   repetitively transmitting the second augmented vector sum signal to move the image, wherein the input device is configured to repetitively transmit the second augmented vector signal until a third vector signal is received, the third vector signal includes a directional component that corresponds to a third movement of the input device different from the second vector signal, and wherein the input device configured to repetitively transmit the second augmented vector signal until the command signal is terminated.

10. A pointing device comprising:
   a housing that forms at least a portion of an exterior of the pointing device;
   a tracking assembly at least partially located within the housing for detecting movement of at least one of the pointing device relative a support surface; and a rotatable ball, the tracking assembly producing a first vector signal with direction data and magnitude data, wherein the first vector signal corresponds to a first movement of the pointing device in order to move an image in a first direction; and
   an actuator comprising a depressible button accessible from the exterior of the pointing device, the actuator producing a command signal, wherein the pointing device:
      once transmitting the vector signal when no command signal is produced with the vector signal; and adding a second vector signal produced by the tracking assembly to the first vector signal to produce an augmented vector signal stored in the input device when a command signal is produced, wherein the second vector signal includes a directional component that corresponds to a second movement of the input device different from the first vector signal, and repetitively transmitting the augmented vector signal scaled by a scaling factor to continuously move the image upon cessation of movement of the input device until the command signal is terminated.

* * * * *